Sept. 6, 1966     H. E. THOMASON     3,270,739
SOLAR HEATER
Original Filed July 29, 1960

INVENTOR
HARRY E. THOMASON
BY Joseph A. Hill
ATTORNEY 3,270,739
SOLAR HEATER
Harry E. Thomason, District Heights, Md.
(7354 Walker Mill Road SE., Washington, D.C. 20027)
Original application July 29, 1960, Ser. No. 46,213.
Divided and this application Aug. 31, 1965, Ser.
No. 484,132
5 Claims. (Cl. 126—271)

The invention described herein may be manufactured and used by or for the Government for governmental purposes without the payment to me of any royalty thereon.

This application is a division of my copending application Serial Number 46,213, filed July 29, 1960, and continuation-in-part of my copending application Serial Number 391,816, filed August 24, 1964, now U.S. Patent No. 3,215,134, which is a continuation of Serial Number 731,064, filed April 25, 1958, and now U.S. Patent No. 3,145,707. The invention relates to an open-flow solar heat collector comprising an insulating base, an irregularly shaped, solar energy absorbing metal heat collecting sheet which is positioned above the base, and a transparent or translucent cover above the collecting sheet. This type collector is highly efficient in collecting solar energy and is very simple and inexpensive to construct. The collector unit is described more fully in my above-mentioned applications. The present invention is an improvement of this type collector.

In recent years much progress has been reported by Harry Tabor and others in the use of "selective" surfaces for solar heat collector sheets which receive solar energy and convert a high percentage of it into heat. As the temperature of the sheet rises, to temperatures of 150–200° F. for example, a selective surface will re-radiate much less heat than a typical blackened sheet (black body). Thus, the net heat gain is considerably higher for a collector sheet with a selective surface than for a sheet with a black surface.

To obtain better efficiency over a long period of time the selective surface should be kept free of corrosion and dirt. One way of minimizing corrosion on the outer surface exposed to incoming solar radiations is to introduce the heat transfer liquid in small streams near the upper edge of the inner surface of the inclined collector sheet. The liquid then clings to the inner surface (underside) of the sheet by molecular attraction as it gravitates down the sheet. The outer surface exposed to solar radiations thus remains dry and is less subject to corrosion. Further, if a black coating is applied to the outer surface of a collector sheet and collecting fluid is passed over the outer surface of the sheet, the coating reduces heat transfer from the sheet to the collecting fluid. If the fluid flows along the inner surface of the collector sheet, however, the fluid is in direct contact with the metal of the collector sheet and, consequently, heat is more easily transferred to the fluid.

An object of this invention is to provide a selective surface solar heat collecting sheet so constructed that the heat collecting fluid gravitates along the inner surface of the sheet, leaving the outer, selective surface dry and free from fluid corrosion and dirt accumulation.

Another object is to provide a selective surface heat collecting sheet so constructed that the heat collecting fluid gravitates along the inner surface of the sheet in direct contact with the metal of the sheet, thereby providing a better heat transfer between sheet and fluid than would be obtained if the fluid flowed along the selective outer surface.

The collector sheet may be corrugated, as illustrated in FIG. 2, or it may be V-crimped, embossed, or otherwise configured, as illustrated in Patent No. 3,145,707, for example.

Figure 1:
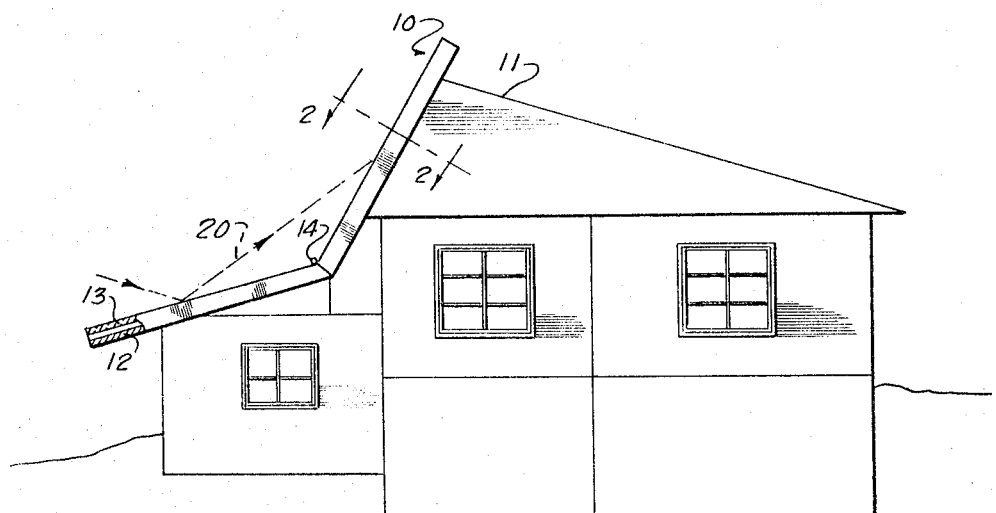
FIG. 1 is an end elevation of a building showing an example of a construction embodying this invention.

Referring to FIG. 1, the solar heat trap is illustrated at 10 with a roof section 11. The section of roof at 12 can have a reflective cover at 13, pivoted at 14, which can be lowered during colder months to reflect sunshine toward the collector as illustrated at 20.

Figure 2:
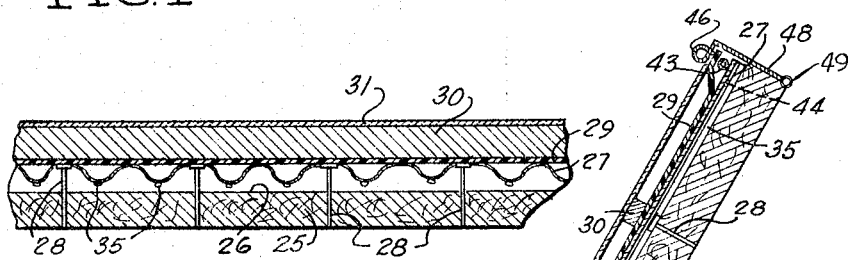
FIG. 2 is a lateral cross sectional view taken along line 2—2 of FIG. 1.

Referring to FIG. 2, the heat collector comprises an insulating material 25 and a heat conductive material such as corrugated sheet metal 27. Preferably a vapor or liquid barrier is employed at 26, and supports 28 maintain sheet 27 spaced above barrier 26. One or more transparencies are employed, for example, a plastic transparency 29 and a glass-like transparency 31 spaced above sheet 29 by spacers 30.

Figure 3:
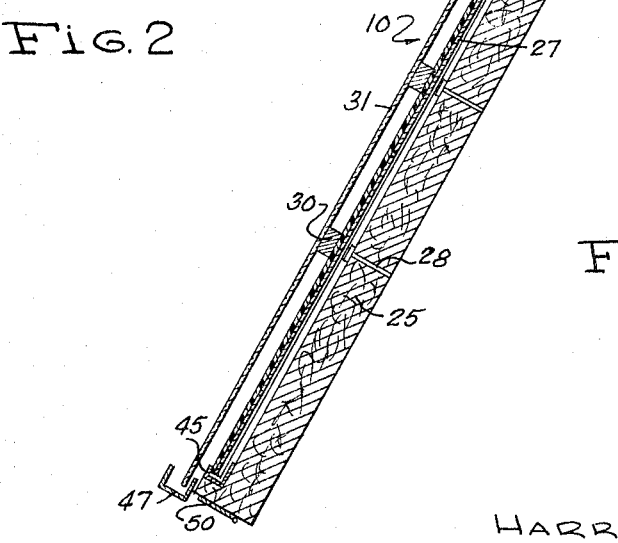
FIG. 3 is a longitudinal center cross sectional view of the heat collector shown in FIG. 2.

In the construction of FIG. 2 a fluid is circulated below the corrugated sheet 27. If the fluid is air, it is preferably introduced at the bottom and brought out at the top. If the fluid to be heated is a liquid such as water, it is introduced near the top of the collector. In FIG. 3, one method for getting the liquid onto the undersides of the valleys of sheet 27 is illustrated. A distributor manifold 43 is used to introduce a small stream of liquid into each valley. Just below the manifold, a hole is placed in each valley as at 44 so that the liquid may run through the hole to the underside of the valley where it will cling to the lower side of the valley as at 35 and will run down the incline. The small streams of heated water are collected in collector manifold 45 and are returned to a place of storage or use.

It is obvious that other apparatus may be used to get the liquid onto the undersides of the valleys such as by spraying the liquid thereagainst, by using an individual tube to project a small stream onto each valley, or by other expedients.

A second distributor manifold can be added at 46 and a second collector trough at 47. In winter, water may be flushed along transparency 31 to dislodge snow or ice from the collector. Also, trough 47 may be connected with the liquid reservoir of the heating system, if desired, to provide makeup water from rain. In summer, water can be circulated along transparency 31 at night to give up heat to the atmosphere. Damper 48, hinged at 49 may be opened to let hot air escape. Damper 50 can be used to let cool air into the collector.

I claim:
1. A solar heat collector mounted in an inclined position and comprising a frame including an insulating base, a heat collecting sheet attached to the base in spaced relation thereabove, a first transparent sheet attached to said frame and suspended above said heat collecting sheet, means attached to the upper end of said frame for introducing small streams of liquid onto the inner surface of said heat collecting sheet to gravitate along the inner surface of said sheet, and collection means attached to the lower end of said frame to collect said liquid.

2. The solar heat collector described in claim 1 wherein the means for introducing liquid onto the inner surface of the heat collector sheet comprises a distributor manifold which introduces the liquid at the outer surface of the sheet, said sheet having openings below said manifold to permit said liquid to drop through said openings to flow down the heat collecting sheet along its inner surface.

3. The solar heat collector described in claim 2 wherein said heat collector sheet comprises a corrugated metal sheet, and wherein said openings in said sheet are located in the corrugation valleys.

4. The solar heat collector described in claim 1 further comprising damper means attached to the frame at the top and bottom of the collector to permit ventilation and escape of excess heat when the dampers are open, and a protective reflective cover for said collector mountable on said frame.

5. The solar heat collector described in claim 4 further comprising a second transparency mounted to the collector frame in spaced relation above said first transparent sheet, means attached to the upper end of said frame for flushing liquid over said second transparency for snow and ice removal, and collection means attached to the lower end of said frame for collecting liquid flowing over said second transparency.

References Cited by the Examiner

UNITED STATES PATENTS

| | | | |
|---|---|---|---|
| 2,005,377 | 6/1935 | Kasley | 122—21 |
| 2,917,817 | 12/1959 | Tabor. | |
| 3,077,190 | 2/1963 | Allen | 126—271 |
| 3,145,707 | 8/1964 | Thomason | 126—271 |

FOREIGN PATENTS 621,392  2/1927  France.

CHARLES J. MYHRE, *Primary Examiner.*